United States Patent [19]

Anderson

[11] 4,031,542
[45] June 21, 1977

[54] PROJECTION COLOR TELEVISION SYSTEM

[75] Inventor: Arthur E. Anderson, Murrysville, Pa.

[73] Assignee: Westinghouse Electric Corporation, Pittsburgh, Pa.

[22] Filed: Mar. 8, 1976

[21] Appl. No.: 665,132

[52] U.S. Cl. .................................. 358/60
[51] Int. Cl.² ......................... H04N 9/31
[58] Field of Search ............ 358/56, 60, 63, 71

[56] References Cited

UNITED STATES PATENTS 2,957,940  10/1960  Cusano ........................... 358/60

OTHER PUBLICATIONS

IBM Technical Disclosure, vol. 16, No. 9, Feb. 1974.

*Primary Examiner*—Robert L. Richardson
*Attorney, Agent, or Firm*—W. G. Sutcliff

[57] ABSTRACT

An improved projection color television system in which an optical radiation pattern, which is primary color coded, is generated by cathode ray tube means and optically coupled by projection optics to a projection screen display means. The projection screen display means includes a support substrate which has a plurality of phosphor areas disposed on the substrate with the phosphors areas including at least one primary color emissive organic phosphor composition. The primary color emissive organic phosphor area is optically registered via the projection optics to the corresponding primary color coded portion of the optical radiation pattern generated by the cathode ray tube means. The projection screen itself is thus emissive of the primary color visible radiation.

12 Claims, 4 Drawing Figures

PROJECTION COLOR TELEVISION SYSTEM

BACKGROUND OF THE INVENTION

The present invention relates to projection television systems in which an enlarged television display is produced for viewing. The color television picture tube offers a bright clear display system for viewing television programming. The largest practical color television picture tube has a diagonal dimension of approximately 25 inches. The practical size limitation for a color television picture tube is largely determined by practical size, weight, and cost considerations. Many attempts have been made to produce enlarged projection display systems for displaying television information. These projection television systems vary from a simple optical projection of the output of the conventional television tube to a display screen, which system depends on relatively high cost optical lenses. In such high cost lens systems as the area of the projected display increases, the cost of the projection optics increases dramatically. The most widely used projection television system is one which uses a light valve or diffraction medium associated with the cathode ray tube to control the passage of visible radiation in correspondence with the television set information signals. These diffractive medium displays are very expensive and have a limited lifetime because of the breakdown of the refractive medium in the vacuum environment. A more recent development in a projection television system is a three tube system with each tube generating primary color radiation with a fixed optics system for projecting the output of each of the primary color tubes onto a display screen. The display screen has a lenticular surface for reflecting back the projected image in a narrow beam path. This system is much less expensive than the diffracted medium system but is still relatively expensive and suffers from a relatively low brightness for the display image.

In summary, prior art projection television display systems all suffer from the disadvatage of relatively high cost and low effective image brightness. The prior art projection television systems all utilize an inactive display screen medium.

SUMMARY OF THE INVENTION

A projection television system is disclosed which utilizes an active luminescent projection screen display means. The system comprises cathode ray tube means for converting electronic color television signals to an optical radiation pattern on the phosphor screen of the tube. The optical radiation pattern is primary color coded. That is, the optical radiation pattern at a specific point or a specific location is generated by a specific primary color luminous signal level, or corresponds to a primary color signal luminous level. Projection optics are provided for coupling the optical radiation pattern produced by the tube to a projection screen display means. The projection screen display means comprises a support substrate having a plurality of at least one primary color emissive organic phosphor area disposed thereon. Primary color emissive organic phosphor areas are optically registered via the projection optics to the corresponding primary color coded portion of the tube optical output radiation pattern. The degree of enlargement is a function of the projection optical system.

DESCRIPTION OF THE PREFERRED EMBODIMENTS

Figure 1:
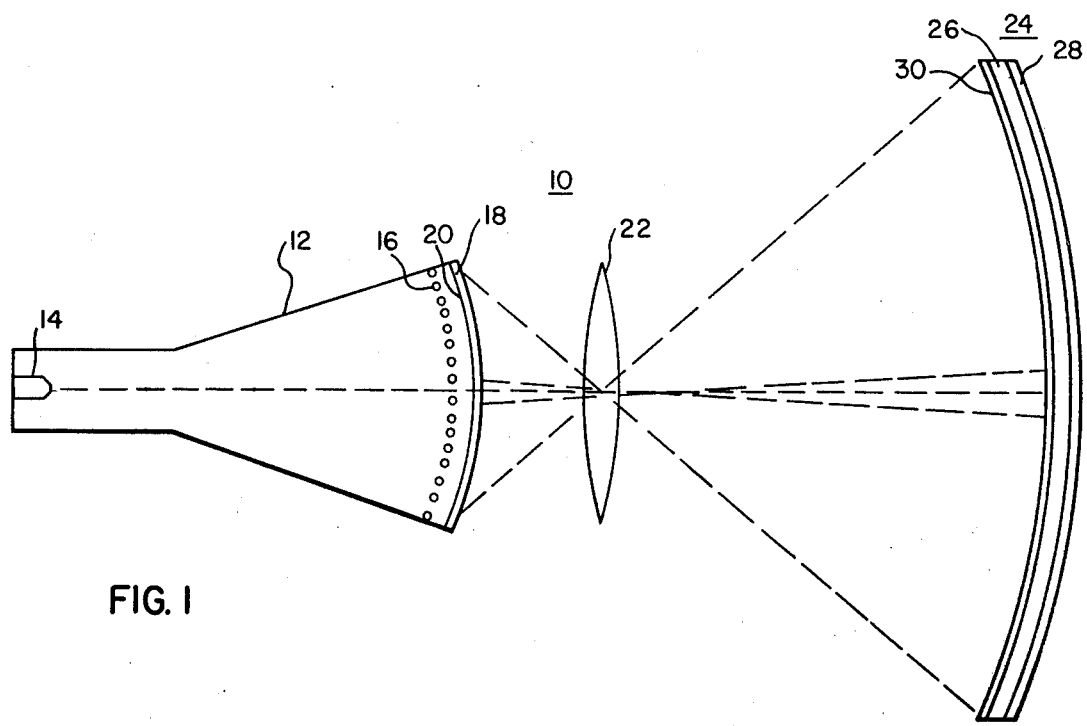
FIG. 1 is a schematic representation of one embodiment of the television projection system of the present invention.

The present invention is illustrated in schematic form in FIG. 1 in which a projection system 10 comprises a cathode ray tube 12, which is a single gum, post deflection, focus-type color picture tube. The cathode ray tube 12 includes a single electron gun 14 disposed in the neck of the tube and a color selection electrode 16 disposed proximate the tube faceplate 18. A raster producing conventional magnetic field means, not shown, is disposed about the neck of the tube between the electron gun and the color selection electrode. The color selection electrode 16 is preferably a parallel set of wires 17 or a grill, which acts to both focus and deflect the electron beam as it passes between the wires of the color selection electrode. Such a post deflection, focus-type tube is well known in the art as described in the literature article, "The Post Deflection Focus Chromatron - A Single or Multi-Gun Tricolor Cathode Ray Tube", Proceedings of I.R.E., Volume 41, page 851, 1953, and also described in the article, "Beam Deflection Color Television Picture Tubes" Proceedings of the I.R.E., Volume 42, page 1, 478,1954. Alternate parallel wires 17 which form the grill-like color selection electrode 16 are interconnected and are in turn connected to potential source means for effecting color selection deflection of the beams and for forcusing of the beam. A short wavelength emissive high-efficiency phosphor material is disposed as a uniform layer 20 on the interior surface of the tube faceplate. The phosphor layer 20 may be, for example, P-47 phosphor material which is an efficient cathodoluminescent inorganic phosphor having peak emission at about 400 nm. A thin conductive anode is disposed atop the phosphor layer on the interior surface of the tube faceplate, and is externally connected to anode potential means as is well known.

Figure 3:
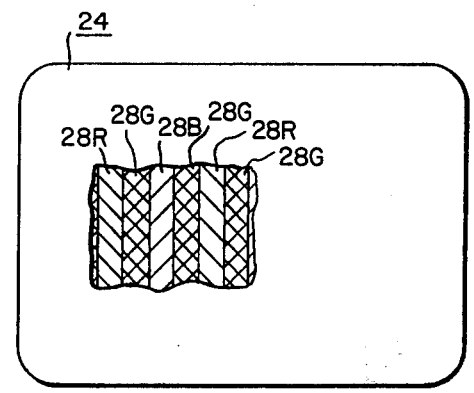
FIG. 3 is a view of the projection display screen of the present invention which is partially enlarged to show the striped phosphor screen structure.

A projection lens 22 which has a low F number is disposed outside the cathode ray tube, and is optically aligned with the tube faceplate to project the optical radiation pattern which is produced on the tube faceplate to a projection screen 24. The projection screen 24 comprises a light transmissive substrate 26 in the embodiment shown in FIG. 1. The violet emission is projected via lens 22 onto the back side of the substrate 26. A plurality of primary color phosphor areas 28 are provided on the opposed side of the substrate, which is the viewing side of the substrate. A large representation of the projection screen 24 is seen in FIG. 3. The phosphor areas 28 are seen as comprising primary color emissive phosphor stripes which are parallel and arrayed across the entire surface of the projection screen. Because of the operational aspects of the post-deflection-focus type tube in this one embodiment, the phosphor stripes on the projection screen are stripes of red phosphor, 28R, green phosphor 28G, blue phosphor 28B, then green 28G, red 28G, blue 28B repeated across the screen as seen in FIG. 3. These phosphor stripes are aligned with the parallel wires of the color selection electrode. Such organic luminescent compositions are described in the article "Daylight Fluorescent Pigments, Inks, Paints and Plastics", in the Journal of Color Appearance, vol. 1, No. 6, Sept. 1972. Organic luminescent pigments are obtainable from the Day Glow Co. of Cleveland, Ohio, with a bright green available as No. 202-18, and a bright red as No. 202-13. The organic phosphor materials are absorptive of the short wavelength optical radiation pattern produced by the cathode ray tube and which individually emit narrow bandwidth primary color radiation. Such organic phosphor materials are now well known and have a very high quantum efficiency approaching 100%. It is this high quantum efficiency of the organic phosphor materials which accounts for the high brightness level achieved in the projection image on the screen of the present invention. The projection screen is a self-luminous screen which will hve the appearance of an enlarged conventional color television picture tube. The projection image on the projection screen is a function basically of the source brightness, i.e., the brightness produced on the cathode ray tube faceplate. It is thus desirable to provide a high brightness level on the cathode ray tube screen. This can be done with a relatively small raster area and with a beam current which is substantially above conventional cathode ray tube beam currents and with a relatively high anode voltage, for example the beam current can be as high as about 4 milliamps and the anode voltage about 50 kilovolts. The cathodoluminescent phosphor must emit at a wavelength which is absorbed by the organic phosphor materials, and is shorter than the shortest wavelength emission of the organic phosphors.

The post deflection focus mask system described above utilizes a single gun to generate an electron beam which is projected through the parallel sets of wires which act to both focus and deflect the beam as it passes between them.

In the post-deflection-focus type tube having a plurality of spaced apart parallel wires, every other wire is connected. All the wires are connected to a DC potential source for applying a focusing potential between the wires and the anode over the phosphor layer 20 as is well known. The alternate connected wire sets are connectable to an AC color selection signal source for applying sine wave potential to the wire sets to direct the electron beam to either the green signal landing area between wires, or to the red or blue signal landing area beneath the spaced apart wires. In this way, the emission from the cathodoluminescent phosphor will vary spatially in correspondence to the color signal landing excitation and is thus color coded. The organic phosphor stripes are optically registered with the corresponding landing areas via the projection optics to insure that the emission from a green phosphor stripe area on the projection screen. The primary color information contained in the optical radiation pattern produced by the cathode ray tub is separable and registerable with the proper primary color organic phosphor area on the screen. In this way the single high current, electron beam can be time shared between red, green and blue signal landing positions with the green signal landing centered between the grid wires and the red and blue signal landing positions alternating between successsive wire positions. This means that the green signal landing position which contains luminous information will appear with twice the spatial frequency as the red and blue signal landings. Thus, color selection can be achieved by application of a simple sine wave deflection voltage which can be derived by resonating the inner electrode grid capacitance with a high Q inductance. The red, green and blue phosphor positions are actually only provided on the projection screen, with the violet emissive cathodoluminescent phosphor provided on the interior of the cathode ray tube. The raster sweeping across the cathode ray tube screen will produce a short wavelength optical radiation pattern from signal landing positions on the phosphor screen which correspond to whether the beam is being deflected by the color selection electrode to the red, green or the blue signal landing positions. In this way, the violet radiation emitted by the cathode ray tube is color coded to primary color brightness signals and is optically coupled to specific phosphor line areas upon the projection screen.

Such a parallel wire post deflection focus-type mask cathode ray tube can have a very high electron beam transmission, for example about 90%, insuring high utilization of the beam current. Use of a single electron gun eliminates all need for convergence circuitry and allows the use of magnetic focusing of the electron gun, insuring the smallest possible spot size under high beam current conditions.

For this post-deflection-focus type tube the tube faceplate has a cylindrical curved surface, and for accurate optical registration with the projection screen phosphor stripes the projection screen would be a cylindrical curved surface. It should be apparent that by varying the projection optics other screen curvatures can be used, or even a flat screen used. The cathode ray tube faceplate shape, the projection optics, and the projection screen curvature are all coordinated to register the primary color information on the desired position on the screen.

An interference filter 30 may be disposed on the side of the projection screen facing the projection optics. The filter is composed of alternate thin films of magnesium fluoride and cerium oxide to be highly transmissive of the short wavelength optical radiation pattern produced by the cathode ray tube. This filter layer 30 is highly reflective of the primary color visible radiation produced by the excited phosphor stripes on the projection screen, so that all of the primary color radiation produced at the screen is projected to the viewer. It is also possible to provide a lenticular surface over the primary color phosphor stripes on the projection screen to further direct the primary color output radiation towards the viewer, and to insure a high brightness level.

Figure 2:
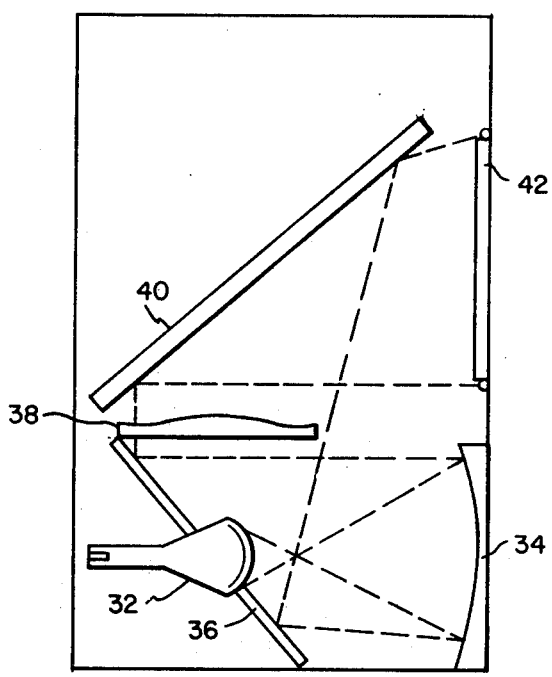
FIG. 2 is an alternative embodiment of the television projection system of the present invention.

An alternative embodiment projection television system is seen in FIG. 2 which is an off axis projection system which again utilizes the cothode ray tube 32, a spherical optical reflective mirror 34, a 45% off-axis mirror 36, a corrective lens 38 and a projection mirror 40 from which the optical radiation pattern is directed to the projection screen 42. Projection screen 42 is essentially the same as the projection screen 24 described above with respect to the FIG. 1 embodiment, and has a plurality of primary color emissive organic phosphor stripes provided on the output side of the projection screen.

While the present invention has been described utilizing a violet phosphor on the cathode ray tube, a blue emissive cathodoluminescent phosphor, such as P-11 phosphor, can also be utilized as the cathode ray tube phosphor. In this case the blue phosphor would be used to optically pump red and green phosphor stripes on the projection screen, while the blue emission would be provided directly by the blue emission from the cathode ray tube.

Figure 4:
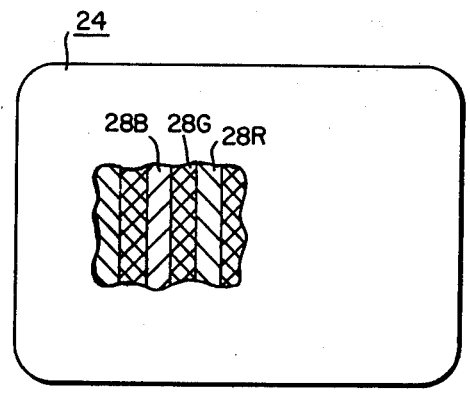
FIG. 4 is a view of another embodiment projection display screen which is partially enlarged to show a different phosphor stripe pattern.

While the present invention has been described initially with respect to a post deflection focus grill-type cathode ray tube system, it is clear that any conventional color television system utilizing a color selection electrode can be utilized in practicing the present invention. In this way, a conventional grill or slot mask picture tube utilizing, for example 3 in-line electron guns, may be utilized to generate the color coded optical radiation pattern from the cathode ray tube which is directed to the organic phosphor projection screen. In such an embodiment, the organic stripe pattern on the projection screen would be the conventional triad stripe pattern with red, green, and blue stripes repeated across the screen, as seen in FIG. 4.

It should also be understood that the broad concept of the present invention can also be applied to improve existing projection television systems which typically use 3 cathode ray tubes, each of which are addressed with primary color information and which are then optically focused onto a display screen which is an inactive screen. It is apparent that an organic phosphor primary color emissive projection screen as described above with respect to the earlier embodiments can be utilized with such a 3-tube optical radiation pattern generating system. Each of the cathode ray tubes could have short wavelength emissive phosphor and the primary color information for each of the three primary colors generates a separate output which corresponds to the primary color information for a single primary color. The three primary color coded optical radiation pattern is then directed by suitable projection optics to the organic phosphor projection screen, which is an active screen, which is pumped to luminescence by the optical radiation pattern. A triad phosphor stripe screen would be used.

In all the embodiments described the projection optics is external to the cathode ray tube but the projection optics can be incorporated into the tube. External projection optics offer the advantage that a common tube type can be used with different optical systems of varying quality and expense and with different magnification factors.

What is claimed is:

1. A projection color television system comprising:
   a. cathode ray tube means for converting electronic color television signals to an optical radiation pattern on a uniform single cathodoluminescent layer phosphor screen of the tube, which optical radiation pattern is primary color coded;
   b. projection optics for coupling the optical radiation pattern produced by the tube to projection screen display means;
   c. projection screen display means comprising a support substrate having a plurality of at least one primary color emissive organic phosphor areas disposed thereon, with the primary color emissive organic phosphor areas being opitcally registered via the projection optics to the corresponding primary color coded portion of the optical radiation pattern.

2. The system specified in claim 1, wherein the cathode ray tube means comprises a single tube which includes at least one electron gun and a color selection electrode disposed within the tube closely spaced from the phosphor screen disposed on the interior surface of the tube faceplate, which phosphor screen is formed of cathodoluminescent material.

3. The system specified in claim 2 wherein the cathodoluminescent material emits short wavelength radiation, and there are three primary color narrow bandwidth emissive organic phosphor areas regularly repeated across the projection screen.

4. The system specified in claim 3, wherein the color selection electrode is a focus grill type electrode with elongated parallel openings and wherein the three primary color emissive organic phosphor areas comprises parallel stripes which are repeated across the projection screen with a green phosphor stripe being every other stripe between red and blue phosphor stripes.

5. A projection color television system comprising:
   A. cathode ray tube means comprising primary color electron gun addressing means, color selection electrode means disposed within said tube proximate a uniform single cathodoluminescent layer phosphor screen disposed on the interior surface of the tube faceplate, whereby primary color coded electron beam signals generated produce a primavy color coded optical radiation pattern on the phosphor screen;
   b. projection optics for coupling the primary color coded optical radiation pattern from the tube to projection screen display means;
   c. projection screen display means comprising a support substrate having a plurality of at least two primary color emissive organic phosphor areas disposed thereon, which primary color emissive organic phosphors are absorbent of and excitable by the color coded optical radiation pattern from the tube phosphor screen, and wherein the primary color emissive organic phosphor areas are disposed to be optically registered via the projection optics to the corresponding primary color coded portions of the optical radiation pattern.

6. The system set forth in claim 5, wherein the cathode ray tube means comprises an in-line three electron gun picture tube having a shadow mask color selection electrode with apertures elongated in one direction, and wherein the primary color emissive organic phosphor areas comprise elongated phosphor stripes.

7. The system set forth in claim 5, wherein the uniform phosphor screen of the tube is formed of a cathodoluminescent short wavelength radiation emissive phosphor, and the projection screen display means includes repeated series of three primary color emissive organic phosphor stripes.

8. The system set forth in claim 5, wherein a single electron gun is included in the tube, and the color selection electrode means comprises a focus grill electrode means by which primary color information is imparted to the electron beam and by which the electron beam is deflected and focused.

9. A projection color television display screen comprising a support substrate and a plurality of at least two primary color emissive organic phosphor areas, which are absorptive of and excitable by optical radiation, disposed in a regular repeated pattern on the substrate.

10. The projection color televidion display screen set forth in claim 9, wherein three primary color emissive organic phosphor stripes are repeated in a regular pattern covering the entire display screen substrate.

11. The projection color television display screen set forth in claim 10, wherein the phosphor stripe pattern is a repeated triad pattern.

12. The projection color television display screen forth in claim 10, wherein the phosphor stripe pattern has a green stripe for every other stripe between red and blue phosphor stripes.

* * * * *